United States Patent
Peters

(10) Patent No.: US 8,824,397 B2
(45) Date of Patent: Sep. 2, 2014

(54) METHODS AND DEVICES FOR TRANSMITTING A CONTROL MESSAGE

(75) Inventor: Gunnar Peters, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 120 days.

(21) Appl. No.: 13/378,596

(22) PCT Filed: Jun. 25, 2009

(86) PCT No.: PCT/SE2009/050811
§ 371 (c)(1),
(2), (4) Date: Dec. 15, 2011

(87) PCT Pub. No.: WO2010/151187
PCT Pub. Date: Dec. 29, 2010

(65) Prior Publication Data
US 2012/0093118 A1  Apr. 19, 2012

(51) Int. Cl.
H04W 80/04 (2009.01)
H04W 88/06 (2009.01)
H04W 28/04 (2009.01)
H04W 72/04 (2009.01)

(52) U.S. Cl.
USPC ........................................................ 370/329

(58) Field of Classification Search
CPC ..... H04W 80/04; H04W 88/06; H04W 28/04; H04W 72/04
USPC ................................................. 370/328, 329
See application file for complete search history.

(56) References Cited

U.S. PATENT DOCUMENTS

| 2009/0003274 | A1 | 1/2009 | Kwak et al. |
| 2009/0088148 | A1* | 4/2009 | Chung et al. ............... 455/423 |
| 2009/0154607 | A1* | 6/2009 | Lindoff et al. .............. 375/341 |
| 2009/0161618 | A1* | 6/2009 | Johansson et al. .......... 370/329 |

FOREIGN PATENT DOCUMENTS

| WO | 2008157692 A2 | 12/2008 | |
| WO | WO 2010041993 | * 4/2010 | .............. H04L 5/00 |

OTHER PUBLICATIONS

Villa, D.L. "Performance of Downlink UTRAN LTE Under Control Channel Constraints." Vehicular Technology Conference, 2008. VTC Spring 2008. IEEE, May 11-14, 2008, pp. 2512-2516, Piscataway, New Jersey, USA.

3rd Generation Partnership Project, "3rd Generation Partnership Project; Technical Specification Group Radio Access Network; Evolved Universal Terrestrial Radio Access (E-UTRA); Physical Channels and Modulation (Release 8)", Technical Specification, 3GPP TS 36.211 V8.4.0, Sep. 1, 2008, pp. 1-78, 3GPP, France.

(Continued)

Primary Examiner — Ronald Abelson
(74) Attorney, Agent, or Firm — Coats & Bennett, PLLC

(57) ABSTRACT

Embodiments disclose a method in a first communication device in a radio telecommunications network for transmitting a control message comprising communication configuration information to a second communication device within the radio telecommunications network. The first communication device determines the communication configuration information of the control message and maps the control message to a plurality of control channel element groups for the second communication device. The first communication device then transmits the control message to the second communication device over the plurality of control channel element groups within a single transmission time interval on a radio control channel.

13 Claims, 11 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 8)", Technical Specification, 3GPP TS 36.213 V8.4.0, Sep. 1, 2008, pp. 1-60, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 1, 2008, pp. 1-137, 3GPP, France.

* cited by examiner

METHODS AND DEVICES FOR TRANSMITTING A CONTROL MESSAGE

TECHNICAL FIELD

Embodiments herein relate to methods and communication devices in a radio telecommunications network, in particular, for transmitting a control message within the radio telecommunications network.

BACKGROUND

Today radio telecommunications networks are common and user equipment connected to a base station within the radio telecommunications network transmits data to the base station using an uplink radio carrier and receives data from a base station over a downlink radio carrier. In radio telecommunications networks a scheduler schedules downlink and uplink transmissions. For example, considering the 3GPP Long Term Evolution (LTE) air interface, a scheduler is situated in an evolved NodeB (eNB) and schedules both the downlink and uplink transmissions between the eNB and user equipments (UEs) in the system.

For the transmission to be successful, the eNB and the UEs have to agree on a wave form to be used. Therefore, scheduling decisions of the scheduler, such as downlink assignments and uplink grants, are transmitted from the eNB to each UE on a Physical Downlink Control Channel (PDCCH) of the eNB.

For PDCCH only quadrature phase shift keying (QPSK) modulation is used, and coded bits of the QPSK are mapped to the resource elements in the first three Orthogonal Frequency Division Multiplexing (OFDM) symbols of a subframe. This is done in the following way.

A resource element is a complex symbol corresponding to one subcarrier in one OFDM symbol. Resource elements are arranged into Control Channel Elements (CCEs), each containing 36 resource elements. Since the PDCCH uses QPSK modulation, this corresponds to 72 (2 times 36) physical bits per CCE. The number of CCEs that are available in each subframe depends on the bandwidth and common channel configuration of the cells.

A downlink assignment or uplink grant is coded as downlink control information (DCI) and these contain in the order of 20 to 70 information bits each. After channel coding, the coded bits are mapped to 1, 2, 4 or 8 CCEs, depending on the channel quality of the link between the eNB and the UE. A Radio Network Temporary Identifier (RNTI) of the UE indicates which group/s of CCEs that are allowed for this UE, and the UE blindly decodes all allowed combinations.

As described above, a control message, such as a DCI, is channel coded and the coded bits are mapped to a group of L CCEs, where L=1, 2, 4 or 8; L is called the aggregation level. For each value of the aggregation level, each UE has a UE specific search space of allowed CCEs that can be used to send the control message. The UE then blindly decodes all possible combinations of aggregation levels and allowed CCEs.

The performance of a physical channel like the Physical Downlink Control Channel (PDCCH) can be measured in Block Error Rate (BLER), i.e. the probability that a transmission of the PDCCH fails. The PDCCH should have a BLER below a certain value for the UE to be considered in good connection with the eNB. Note that if the information sent of the PDCCH is lost, the traffic on the traffic channels, Physical Downlink Shared CHannel (PDSCH) and the Physical Uplink Shared CHannel (PUSCH), can not be sent, since the UE is not informed on the waveform of the transmissions, and therefore the whole transmission attempt is lost.

The BLER depends on the modulation, code rate used and on the effective Signal to Interference and Noise Ratio (SINR) at the receiver. The BLER decreases with decreasing code rate and with increasing SINR. Looking at BLER as a function of SINR for different code rates one may discover that the code rate of the PDCCH is inversely proportional to the number of CCEs used.

A Link Adaptation for PDCCH calculates the effective SINR over the bandwidth and then uses the information contained in a graph. The number of CCEs is chosen so that, for the calculated effective SINR, the expected BLER is below the target BLER for PDCCH.

Since only the PDCCH uses QPSK modulation and not more than 8 CCEs (576 coded bits) are available to transmit each DCI, the code rate is limited from below, and a minimum SINR is required for successful transmission of the PDCCH.

A minimum SINR implies limitations both on tolerated path loss, i.e. on coverage, and on the tolerated interference level, i.e. on the overall load in the system. This implies a problem in that the control channel, such as the PDCCH, may be limiting both on coverage and capacity, that is, the performance, of the radio telecommunications technology in certain scenarios. For example, if a failure of a transmission is eventually detected, a new attempt to perform the transmission is made; this will take time, delaying the transmission, resulting in a reduced performance of the radio telecommunications network.

SUMMARY

It is therefore an objective of the present solution to provide a mechanism enabling an efficient communication between a first and second communication device within a radio telecommunications network improving the performance of the radio telecommunication network.

According to a first aspect of the present solution, the object is achieved by a method in a first communication device, such as a base station, in a radio telecommunications network for transmitting a control message to a second communication device, such as a UE, within the radio telecommunications network. The control message comprises communication configuration information, such as scheduling information, DCI.

The first communication device determines the communication configuration information of the control message to be transmitted to the second communication device. Furthermore, the first communication device maps the control message to a plurality of control channel elements groups, and transmits the control message over the plurality of control channel element groups within a single transmission time interval on a radio control channel.

According to a second aspect of the present invention, the object is achieved by providing a first communication device. The first communication device comprises a control unit arranged to determine the communication configuration information of the control message to be transmitted to the second communication device. The control unit is further arranged to map the control message to a plurality of control channel element groups for the second communication device. The first communication device further comprises a transmission interface arranged to transmit the control message over the plurality of control channel element groups within a single transmission time interval on the radio control channel.

According to a third aspect of the present solution, the object is achieved by a method in the second communication device. The method is for using at least part of the communication configuration information in the control message. The second communication device receives control signaling from the first communication device over the radio control channel. The second communication device then decodes all allowed control channel element groups in a single transmission time interval of the radio control channel. Additionally, the second communication device detects a plurality of control messages intended for the second communication device within a plurality of control channel element groups within the single transmission time interval of the radio control channel. The second communication device determines a control channel element group with the highest signal quality of the plurality of control channel element groups. Then, the second communication device uses at least part of the communication configuration information in the control message detected in the control channel element group with the highest signal quality.

According to a fourth aspect of the present solution, the object is achieved by providing a second communication device. The second communication device comprises a communication module arranged to receive control signaling on a radio control channel. Furthermore, the second communication device comprises a control unit arranged to decode all allowed control channel element groups in a single transmission time interval of the radio control channel. The control unit is further arranged to detect a plurality of control messages intended for the second communication device within a plurality of control channel element groups within the single transmission time interval and also to determine a control channel element group with the highest signal quality of the plurality of control channel element groups. Additionally, the control unit is arranged to determine to use at least part of a communication configuration information in the control message received in the control channel element group with the highest signal quality.

By sending the communication configuration information a plurality of times within a single transmission time interval the probability of missing the communication configuration information is reduced. This enables a more efficient communication between a first and second communication device within a radio telecommunications network, which in turn improves the performance of the radio telecommunication network.

In Long Term Evolution (LTE) embodiments, scheduling decisions, such as DCI, made in a first communication device of an Evolved Universal Terrestrial Radio Access Network (E-UTRAN) are sent over a Physical Downlink Control Channel (PDCCH) to a second communication device. The 3GPP standard limits the code rate of this channel from below, in such a way that this limits the coverage and allowed load of an LTE system. However, embodiments herein design means by which the coverage and load limitations could be improved beyond what is seemingly allowed in the 3GGP standard. Some embodiments herein, wherein the multiple transmissions of the control message within the Transmission Time Interval is performed during hand over process, also improve Hand Over performance of a second communication devices in bad coverage in order to reduce the interference level in an LTE system. Hence, embodiments herein enable an efficient communication between a first and second communication device within a radio telecommunications network improving the performance of the radio telecommunication network.

BRIEF DESCRIPTION OF THE DRAWINGS

Embodiments will now be described in more detail in relation to the enclosed drawings, in which.

DETAILED DESCRIPTION

Figure 1:
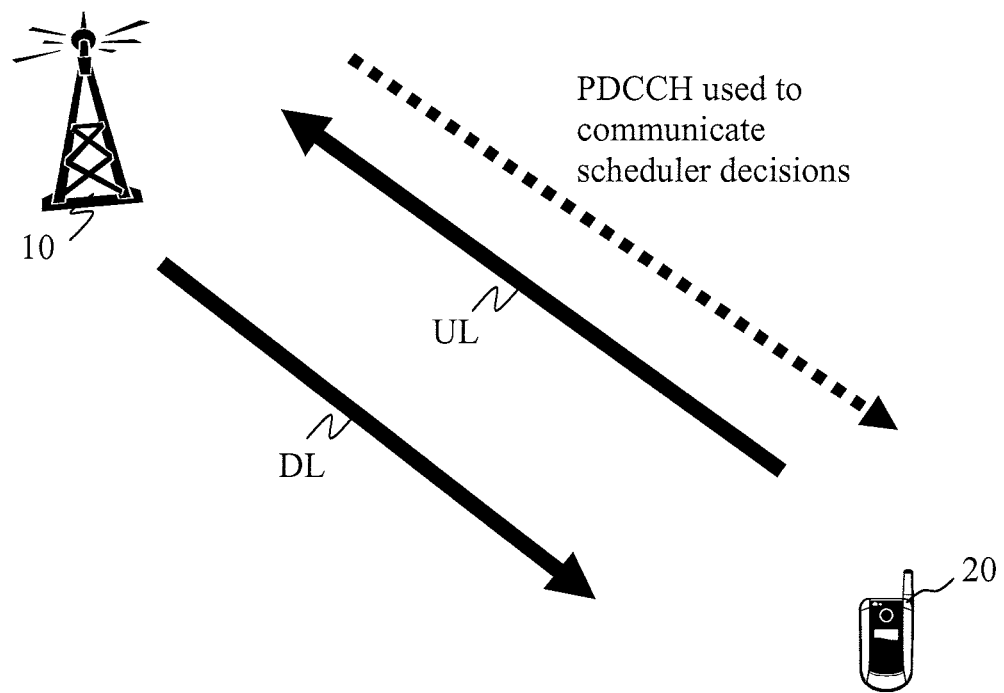
FIG. 1 shows a schematic overview of a radio telecommunications network.

In FIG. 1, a schematic overview of a radio telecommunications network is shown. The radio telecommunications network may comprise LTE advanced, LTE, Universal Mobile Radio telecommunications System (UMTS) and/or the like.

A first communication device 10, such as a radio base station, is communicating with a second communication device 20, such as a UE, for example, a mobile phone and/or the like. The second communication device 20 is communication over an Uplink (UL) to the first communication device 10 and the first communication device is communicating with the second communication device 20 over a DownLink (DL). A scheduler within the first communication device 10 evaluates different types of information, e.g. Quality of Service parameters, measurements from the second communication device 20, second communication device 20 capabilities, buffer status and/or the like to determine scheduling decisions for the UL and DL of the second communication device 20.

The first communication device 10 transmits communication configurations comprising the scheduling decisions, such as wave form to use, to enable communication between the first communication device and the second communication device 20. Thus, the first communication device 10 informs the second communication device 20 about the allocated time/frequency resources and the transmission formats to use. The scheduling decisions, such as a downlink control information (DCI), are sent in a control message. A Physical Downlink Control Channel (PDCCH), indicated in FIG. 1 as a dashed line, carries the scheduling decisions from the first communication device to the second communication device; the PDCCH is hence used to convey the scheduling decisions to individual second communication devices. The PDCCH is located in the first three OFDM symbols of a time transmission interval (TTI), which TTI comprises a subframe.

As an example, without loss of generality, a certain DCI is to be sent from the first communication device 10 to the second communication device 20. A Link Adaptation shows that this second communication device 20 is out of coverage, even if eight control channel elements (CCEs) would be used, i.e. Link Adaptation shows that the expected Block Error Rate (BLER) is higher than the target BLER. Link adaptation is used to denote the matching of the modulation, coding and other signal and protocol parameters to the conditions on the radio link reported from the second communication device 20.

The basic idea of the present solution is that instead of resending the DCI after a failure is detected several transmission time intervals (TTIs) later, send the same DCI several times in a single TTI.

Embodiments accomplish this by mapping the same DCI to several different groups of CCEs. Each of these groups should lie within the allowed set for a corresponding Radio Network Temporary Identifier (RNTI) associated with the second communication device 20. That is, within the allowed search space of different aggregation levels of CCEs. Assuming independent "noise plus interference" on the two groups, the transmission success of the two attempts are an independent event from a probability theory point of view. The probability that all transmission attempts are lost is then considerably lower than the probability that an attempt using only one group of CCEs is lost. The target BLER can therefore be achieved even if Link Adaptation shows that this can not be done using eight CCEs.

The minimum Signal to Interference and Noise Ratio (SINR) at which a transmission can be successful is therefore lowered using embodiments disclosed herein. Lowering the minimum SINR required in the system, will increase the coverage of the system or the allowed load in the system, as the higher allowed load affects the SINR negatively, or both. Note that, even if this scheme uses a large number of the PDCCH resources when the second communication device is out of coverage, only a small amount of second communication device 10s will have an SINR so low that this scheme is needed.

By transmitting the same control message multiple times in a single TTI, the probability that all these transmission attempts fail is lower than the error probability of one of the attempts. This enables a combined expected BLER below the target BLER also for SINR values for which this is not possible with one attempt using eight CCEs.

Hence, embodiments herein enable an efficient communication, indicated in FIG. 1 as the arrows of UpLink (UL) and DownLink (DL) traffic, between the first communication device 10 and the second communication device 20 within a radio telecommunications network improving the performance of the radio telecommunication network.

Figure 2:
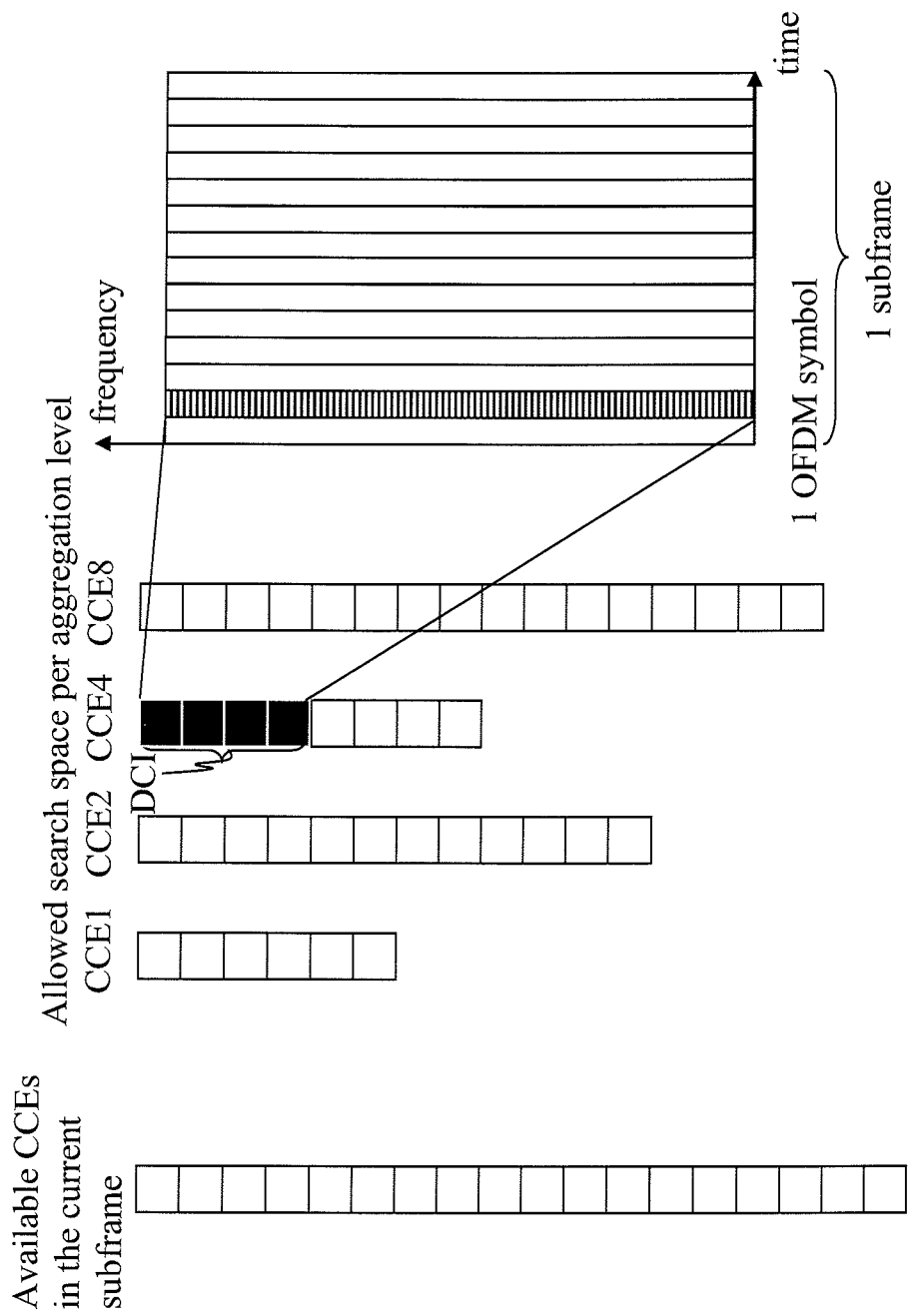
FIG. 2 shows a schematic overview of mapped control channel element groups.

In FIG. 2, a schematic overview of mapped control channel element groups being used by the second communication device 20 is shown.

To illustrate a CCE mapping for a second communication device 20, a simple example is shown in FIG. 2. More complicated patterns are possible, but the simplified example is used to demonstrate the principles.

The leftmost column in FIG. 2 shows all available CCEs in the subframe. For each value of the aggregation level, each second communication device 20 has a second communication device 20 specific search space of allowed CCEs that can be used to send the control message. For the second communication device 20 considered in this example, the six first CCEs are available for aggregation level L=1, denoted as CCE1 in FIG. 2, the first twelve CCEs for L=2, denoted as CCE2 in FIG. 2, the first eight CCEs for L=4, denoted as CCE4 in FIG. 2, and the first sixteen CCEs for L=8, denoted as CCE8 in FIG. 2.

Furthermore, FIG. 2 shows the example were aggregation level L=4 is used to transmit a DCI (striped CCEs). The bits are then mapped onto one OFDM symbol (Sy) in a subframe (1 subframe) and interleaved with control messages for other RNTIs (associated with different second communication devices). In this way the coded bits from one control message are spread out over the entire frequency band. A subframe may be of a time period of 1 ms of 14 symbols. In the illustrated subframe, frequencies are disclosed along the Y-axis and time is disclosed along the X-axis.

As can be seen in FIG. 2, the second communication device 20 can use several, for example, four alternative groups of CCEs to transmit the control message. The aggregation level required depends on the channel quality as described above. Within one aggregation level several different groups are possible. In order to improve the probability to receive link control information of the control message, the control message is sent multiple times over the same aggregation level or over different aggregation levels within a single transmission time interval, as will be described below.

Figure 3:
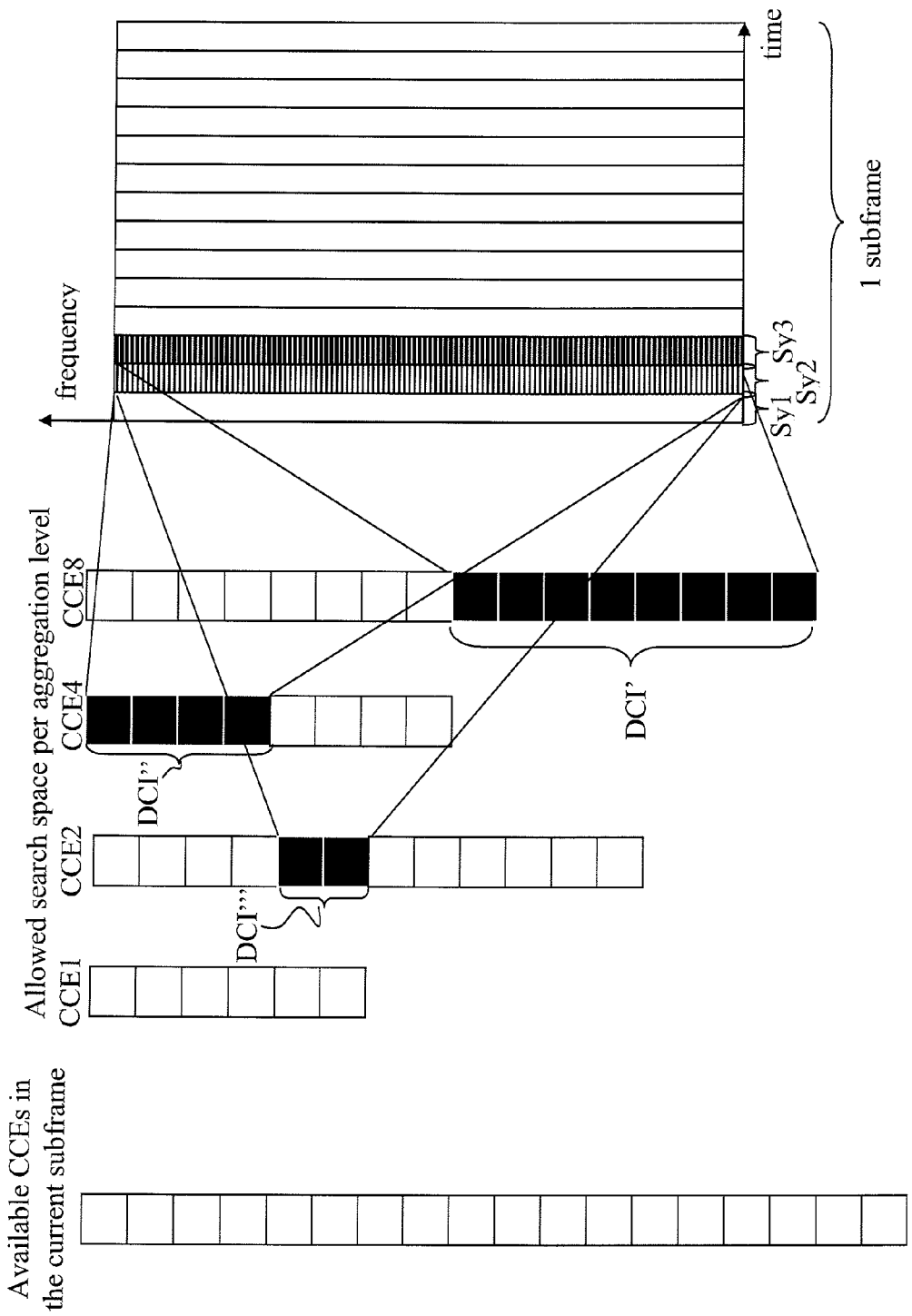
FIG. 3 shows a schematic overview of a control message mapped to a plurality of groups of control channel elements.

In FIG. 3, mapping of a control message to a plurality of CCE groups in a single Transmission Time Interval (TTI) is shown. The leftmost column in FIG. 3 shows all available CCEs in the subframe. For each value of the aggregation level, each second communication device 20 has a second communication device specific search space of allowed CCEs that can be used to send the control message. For the second communication device 20 considered in this example, the six first CCEs are available for aggregation level L=1 CCE1, the first twelve CCEs for L=2 CCE2, the first eight CCEs for L=4 CCE4 and the first sixteen CCEs for L=8 CCE8.

Multiple transmissions of the control message are achieved by mapping the control message to several of the possible choices of CCE groups for the second communication device 20. This may be done so that the different CCE groups used are not overlapping. In this way, the control message will be sent in multiple places of the TTI. For example, the control message comprises control information such as a DCI and the DCI is first coded with a first code rate resulting in a first coded control message DCI' that fits in a CCE group, CCE8 comprising 8 CCEs. To increase the probability for detection, and/or reduce the risk of misdetection/missing the DCI, the DCI is then coded with a different code rate, resulting in a second coded control message DCI" to be mapped to CCEs of a different CCE group. The different CCE group, CCE4, comprises in the illustrated example 4 CCEs. It should here be understood that the DCI of the same code rate may be transmitted in a different group of the same number of CCEs resulting in, for example, a so called 8+8 CCEs transmission.

Furthermore, the DCI is further coded with a third code rate resulting in a third coded control message DCI'" to be mapped to a third group. In the illustrated example, the DCI'" is mapped to a CCE group, CCE2, comprising 2 CCEs.

A PDCCH TTI comprises three OFDM symbols Sy1, Sy2, Sy3 for control signaling whereof the present scenarios uses Sy2 and Sy3. The bits of DCI' are mapped onto one OFDM symbol Sy3 in the subframe and interleaved with control messages for other RNTIs; the bits of DCI" and DCI'" are mapped onto a different OFDM symbol Sy2 and interleaved with each other as well as control messages for other RNTIs. In this way the coded bits from one control message are spread out over the entire frequency band. A subframe may be of a time period of 1 ms of 14 symbols. In the illustrated subframe, frequencies are disclosed along the Y-axis and time is disclosed along the X-axis.

Adopting the scheme of multiple transmissions, Link Adaptation tables for PDCCH may be extended with tables for all possible combinations of CCE groups. It should though be noted that by introducing the multiple of transmission of control message within a single/same transmission time interval the probability to miss the control message is so reduced that the link adaptation tables may not be needed.

A plurality of link adaptation tables are maintained at the receiving device and/or the transmitting device. Each link adaptation table defines the mapping of available bit patterns to link adaptation parameters usable for transmitting the user data. The mapping depends on at least one link adaptation parameter employed for transmitting the control signaling. The selection of the appropriate link adaptation table may depend on the link adaptation parameter.

By transmitting the control message a plurality of times within a single TTI the probability to miss the control message is reduced, which enables an efficient communication between the first communication device 10 and the second communication device 20 resulting in an improved performance of radio telecommunications network.

Figure 4:
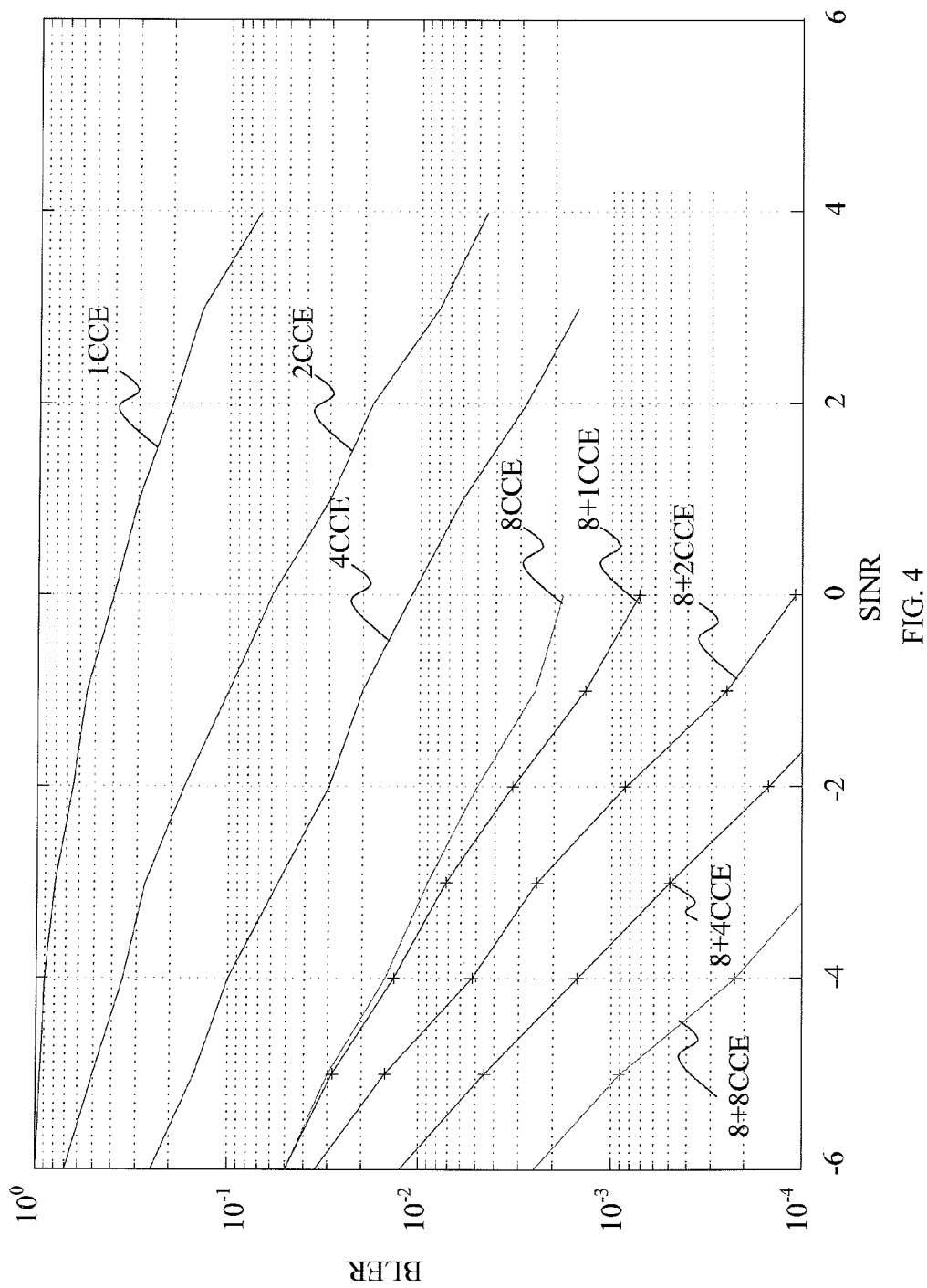
FIG. 4 shows an exemplary graph of BLER for a specific DCI as a function of the effective SINR.

FIG. 4 shows link performance for some cases of multiple transmissions of the control message in a single TTI. The FIG. 4 shows BLER for a specific DCI as a function of the effective SINR in a graph wherein BLER is defined along the Y axis and SINR is disclosed along the X axis. FIG. 4 shows the extension for 8+1 CCEs, 8+2 CCEs, 8+4 CCEs and 8+8 CCEs. However, all combinations of 8, 4, 2 and 1 CCE that are allowed by the search spaces in FIG. 2 and FIG. 3 should have similar link adaptation tables.

The additional curves in FIG. 4 are obtained using the assumption that the detection attempts of different CCE groups are independent from a probability aspect. This is valid for a static radio channel and white noise interference. Accurate tables for realistic scenarios may be obtained from appropriate link simulations.

It should be noted that curve 1 CCE discloses the outcome of a control message within a CCE group of 1 CCE, curve 2 CCE discloses the outcome of a control message within a CCE group of 2 CCEs, curve 4 CCE discloses the outcome of a control message within a CCE group of 4 CCEs, and curve 8 CCE discloses the outcome of a control message within a CCE group of 8 CCEs. Furthermore, curve 8+1 CCE discloses the outcome of a control message mapped to a CCE group of 8 CCEs and a CCE group of 1 CCE within a single TTI; curve 8+2 CCE discloses the outcome of a control message mapped to a CCE group of 8 CCEs and a CCE group of 2 CCEs within a single TTI; curve 8+4 CCE discloses the outcome of a control message mapped to a CCE group of 8 CCEs and a CCE group of 4 CCEs within a single TTI; and curve 8+8 CCE discloses the outcome of a control message mapped to a CCE group of 8 CCEs and a second CCE group of 8 CCEs within a single TTI.

As seen in FIG. 4, a coverage gain of around 1 dB is obtained with 8+2 CCEs while a gain of several dBs is obtained using 8+8 CCEs compared to merely use a transmission of the control message in one group of 8 CCEs. The minimum SINR at which a transmission can be successful is therefore lowered using embodiments disclosed herein. As stated above, lowering the minimum SINR required in the system will increase the coverage of the system or the allowed load in the system or both.

Figure 5:
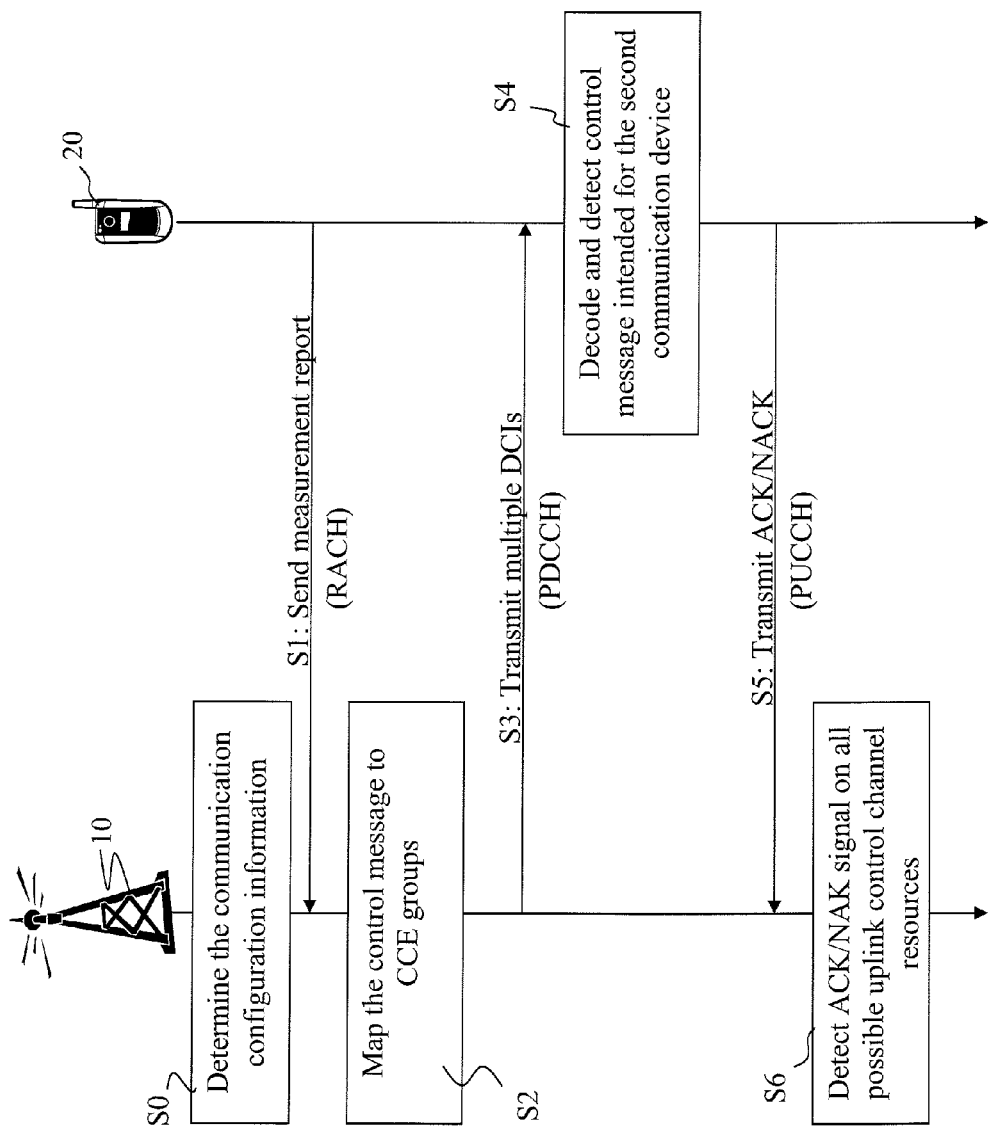
FIG. 5 shows an example of a combined method and signaling scheme in a radio telecommunication system.

In FIG. 5, a schematic combined method and signaling scheme in a radio telecommunications network is shown.

In step S0, the first communication device 10, such as an eNB, determines communication configuration information for enabling communication between the first communication device 10 and a second communication device 20, such as a UE. The communication configurations are assembled into a control message. For example, scheduling information regarding downlink/uplink may be determined and assembled into the control message. The control message may comprise DCI.

In step S1, measurement reports are transmitted over a random access channel (RACH) during connection set up from the second communication device 20 to the first communication device 10. The measurement reports indicate, for example, Channel Quality Index (CQI), Block Error Rate (BLER), and/or Signal to Interference Noise Ratio (SINR).

In step S2, based on the received measurement reports from the second communication device 20, the control message may be coded in one or more code rates. It should here be noted that the control message may not be coded at all using a CCE group comprising merely one CCE. The control message is then mapped to several different groups of CCEs. Each of these CCE groups should lie within the allowed set for the corresponding identifier of the second communication device.

In step S3, the first communication device 10 transmits the control message multiple times within a transmission time interval on a PDCCH to the second communication device 20. The control message is transmitted on the different CCE groups. Assuming independent "noise plus interference" on, for example, two groups, the transmission success of the two attempts are independent events from a probability theory point of view, resulting in a lower probability that the control message will be missed at the second communication device 20.

A PDCCH is broadcasted in the first three symbols out of 14 symbols of a subframe which are transmitted every millisecond. In downlink direction, resources are scheduled for the device on the PDCCH whenever data arrives from the network.

In step S4, the second communication device 20 receives the control message on the PDDCH from the first communication device 10 and the second communication device 20 starts to decode all possible combinations of CCE groups. Once a control message is detected, either the second communication device 20 stops or continues to decode the remaining possible groups of CCEs. If two DCIs possibly the same, are detected within the time interval, this may be a possible error case due to misdetection which can occur even if the scheme of multiple transmissions is not used. This case therefore has to be handled by the second communication device 20. An appropriate behavior of the second communication device 20 would be to choose the DCI carried on the group of CCEs with highest channel quality defined by, for example, highest SINR.

In step S5, the second communication device 20 transmits Hybrid Automatic Repeat request (HARQ) acknowledged (ACK)/not acknowledged (NAK) on a Physical Uplink Control Channel (PUCCH). The PUCCH is implicitly scheduled shortly after a downlink transmission. If the transmission is not successful a NAK will be sent on PUCCH back to the first communication device 10 to indicate the need for retransmission of the data. If the transmission is successful an ACK is sent on the same PUCCH resource to the first communication device 10.

The second communication device 20 may map the ACK or NAK to a specific PUCCH resource and there is a fixed mapping between the group of CCEs used on PDCCH and which PUCCH resource to be used. Since embodiments use several different CCE groups to transmit the ACK/NAK, it is not known on which of these groups the second communication device 20 succeeds to detect the control message. The first communication device 10 therefore has to detect the ACK/NAK signal on all possible PUCCH resources corresponding to the multiple choices of CCE groups.

In step S6, the first communication device 10 receives and detects ACK/NAK on all possible PUCCH resources corresponding to the used CCE groups of the control message. Based on the received ACK/NAKs the first communication device 10 determines whether to retransmit data or if the transmission has been successful. If the first communication device 10 does not receive any ACK/NAK on the corresponding resources of PUCCH, the transmission is considered to have failed and the data is retransmitted.

As stated above, the minimum SINR, at which the target BLER for PDCCH can be reached, is lowered by several dBs using embodiments herein. This allows a higher load in the system and a better coverage for both uplink and downlink traffic.

A special case is when the second communication device 20 is performing a Hand Over (HO) process from one cell to another. The HO related Radio Resource Control (RRC) signaling is scheduled, and the PDCCH has to be detected for the HO procedure to succeed. A second communication device 20 in HO is usually in bad coverage in the cell in which the scheduling is done. If the PDCCH is not detected fast enough, this second communication device 20 will cause a lot of interference in the target cell. It would therefore be desirable to improve the performance of PDCCH of this second communication device 20 beyond what is possible with the maximum number of CCEs, 8 CCEs, which is achieved by transmitting the control message a plurality of times within a TTI.

Figure 6:
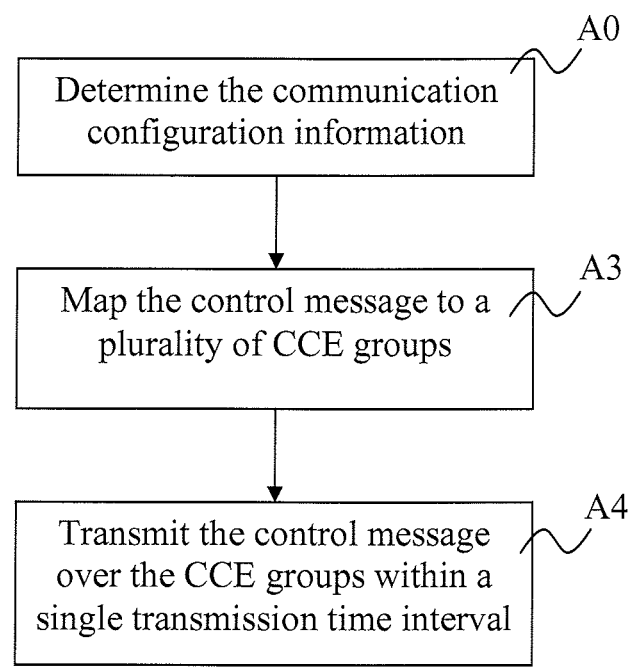
FIG. 6 shows a schematic overview of a flow chart of a method in a first communication device.

According to a general embodiment of the present solution, FIG. 6 shows schematic flowchart of a method in the first communication device 10 for transmitting a control message to the second communication device 20. As mentioned above, the first communication device 10 may comprise a base station, such as a radio base station (RBS), an evolved NodeB (eNB) or a NodeB (NB).

In step A0, the first communication device 10 determines the communication configuration information, such as downlink information, of the control message to be transmitted to the second communication device 20. The communication configurations may be based on received measurements, and/or be preconfigured.

In step A3, the first communication device 10 maps the control message to a plurality of control channel element groups for the second communication device 20.

In step A4, the first communication device 10 transmits the control message to the second communication device 20 over the plurality of control channel element groups within a single transmission time interval on a radio control channel. In some embodiments, the CCE groups are interleaved with control messages for other RNTIs in an OFDM symbol of PDCCH.

Hence, as stated above the solution enables an efficient communication between the first communication device 10 and the second communication device 20 resulting in an improved performance of the radio telecommunications network.

Figure 7:
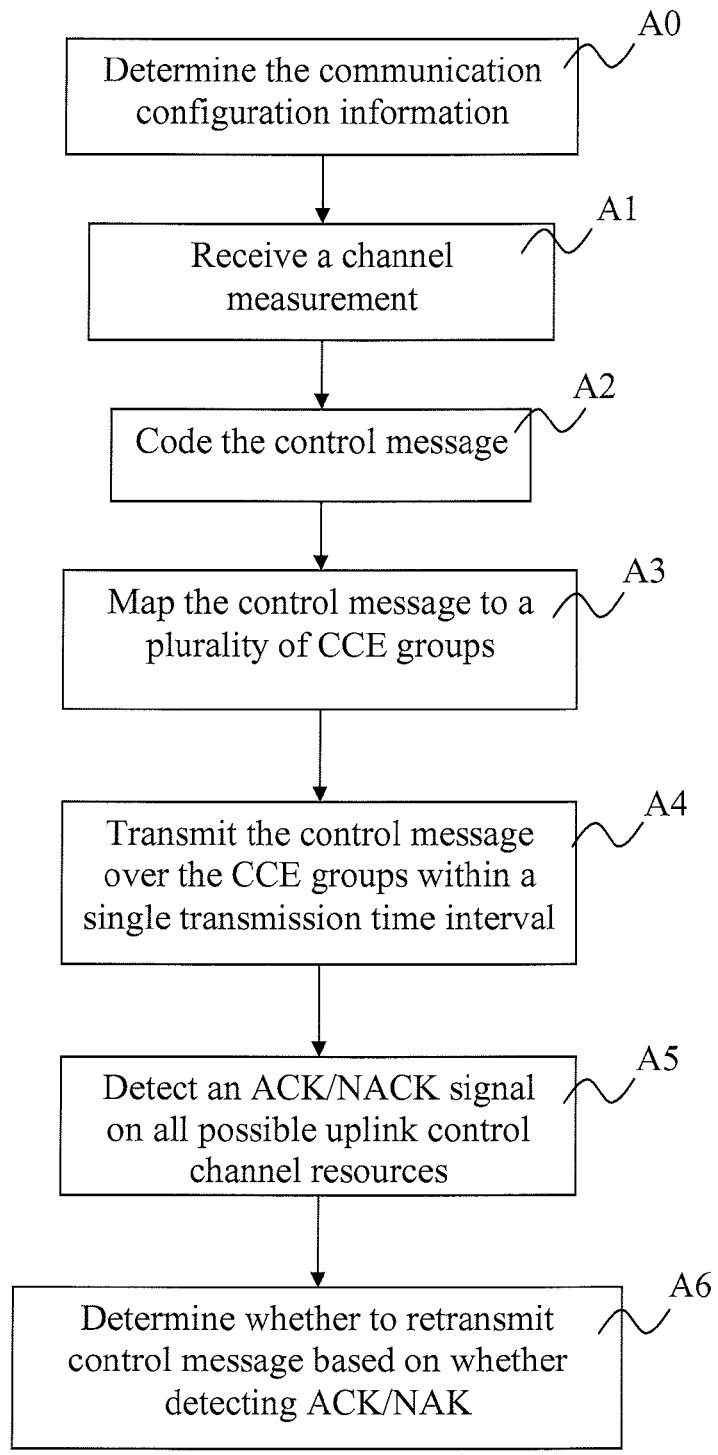
FIG. 7 shows a schematic overview of a flow chart of a method in a first communication device.

According to some further embodiments, FIG. 7 shows a schematic flow chart of a method in the first communication device for transmitting a control message to the second communication device 20.

In step A0, the first communication device determines a communication configuration information, such as downlink information, of the control message to be transmitted to the second communication device 20. The communications configuration information may be assembled into the control message. The communication configuration information enables communications between the first communication device 10 and the second communication device 20 and may be based on received measurements, and/or be preconfigured. Step A0 in FIG. 7 corresponds to step A0 in FIG. 6.

In optional step A1, the first communication device 10 receives a report from the second communication device 20. The report comprises a channel measurement indicating, for example, Channel Quality Index (CQI), Block Error Rate (BLER), Signal to Interference Noise Ratio (SINR) and/or the like, of the radio control channel.

In optional step A2, the first communication device 10 codes the control message with a first code rate into a first coded control message, wherein the first code rate is based on a predetermined possibility value indicating possibility to detect the control message and the received report. In some embodiments, the first communication device 10 receives channel measurement report, such as CQI, of the radio channel from the second communication device 20 and based on that and together with a preset probability value for PDCCH, such as 1%, a scheduler in the first communication device 10 determines a first code rate. The code rate is the amount of coded bits related to origin bits. The minimum of amount of coded control message bits is set to be the control bits divided by the code rate.

As in FIG. 6, in step A3, the first communication device 10 maps the control message to a plurality of control channel elements groups for the second communication device 20. In the embodiments according to FIG. 7, this mapping may be based on the amount of the coded control message bits. For example, a control message, such as a DCI, of 50 bits is coded using a code rate of ⅓ gives an amount of coded control message bits of at least 150 bits. As a CCE comprises at the most 72 bits, the coded control message need to be transmitted/mapped to a CCE group of 4 CCEs. Hence, in some embodiments, wherein the first communication device codes the control message with the first code rate into a first coded control message, the mapping of the control message comprises to map a first control channel element group to be used to transmit the control message based on the first coded control message.

In some embodiments, the plurality of control channel element groups comprises a single/same amount of control channel elements. And, in some embodiments, the plurality of control channel element groups comprises different number of control channel elements. Hence, the first communication device determines the plurality of control channel element groups of different aggregations levels, wherein an aggregation level is determined depending on the control channel quality. It should be noted that within one aggregation level several different groups are possible.

In some embodiments, for example, wherein the plurality of control channel element groups comprises different number of control channel elements, the first communication device also codes the control message according to a second code rate into a second coded control message. The first communication device maps the second coded control message to a second control channel element group comprising a different number of control channel elements than the first control channel element group. For example, the control message may be coded a second time using a code rate of ½ resulting in at least 100 coded control message bits. These may be mapped to CCEs in a CCE group of 2 CCEs.

In some embodiments, the first/second control channel element group is determined from at least one table resulting in a code rate to be used.

The first communication device 10 then selects the CCE groups being interleaved according to a preset formula over OFDM symbols, taken time and identity of the second communication device 20 into consideration.

In step A4, the first communication device 10, as in step A4 in FIG. 6, then transmits the control message to the second communication device 20 over the plurality of control channel element groups within a single, the same, transmission time interval on a radio control channel. The radio control channel may comprise a physical downlink control channel. In some embodiments, the control channel element groups are interleaved with control messages for other RNTIs.

Hence, the method results in multiple transmissions of the control message by mapping the control message to a plurality of CCE groups for the second communication device 20 within a single transmission time interval on the PDCCH.

In some embodiments, Hand Over is made of the second communication device 20, such as a UE, from a source cell to a target cell served by the first communication device. Thus, the method is performed during a handover process wherein the first communication device receives a hand over request associated to the second communication device 20. The second communication device 20 performing hand over is typically at the cell boarder and could be out of coverage in the source cell. At the same time it is important to make a fast hand over to avoid creating high interference in the target cell for the hand over procedure. It would therefore be desirable to improve the performance of PDCCH of this second communication device 20 beyond what is possible with the maximum number of CCEs, which is achieved by transmitting the control information a plurality of times within a TTI when a hand over request from the second communication device 20 is received.

In optional step A5, the first communication device 10 detects an ACK/NAK signal on all possible uplink control channel resources corresponding to a multiple choices of control channel element groups.

In optional step A6, the first communication device 10 determines whether to retransmit control message or not based on the previous detection step. That is, based on whether the first communication device 10 has detected an ACK or NAK or no acknowledgement data at all on possible uplink control channel resources.

Figure 8:
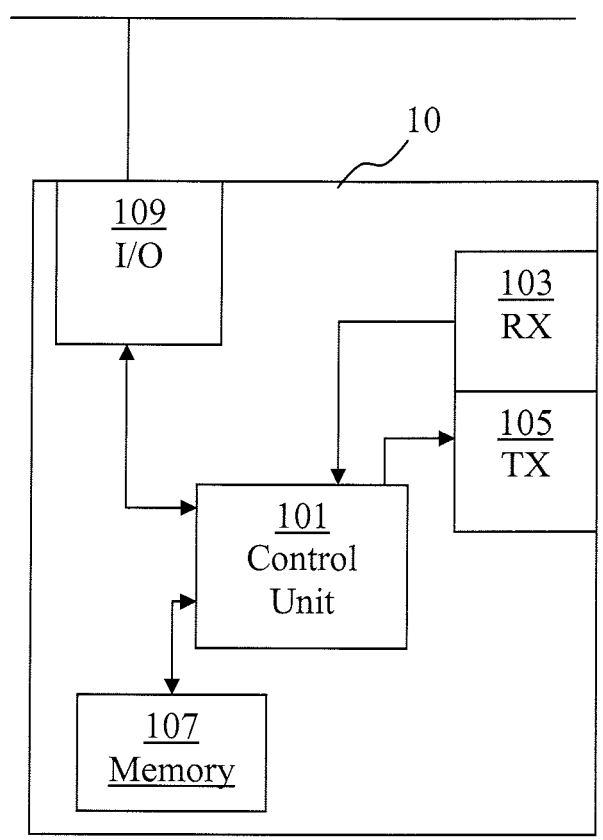
FIG. 8 shows a schematic overview of a first communication device.

In order to perform the method above a first communication device is provided. In FIG. 8, a schematic overview of the first communication device 10 is shown. The first communication device may comprise a radio base station (RBS), eNB, and/or NB. The first communication device 10 is arranged to transmit the control message to the second communication device 20. The control message comprises communication configuration information such as downlink control information.

The first communication device comprises a control unit 101 arranged to determine the communication configuration information to be transmitted to the second communication device 20, and to transmit the control message a multiple of times over a transmission interface unit 105 within a single transmission time interval. This is performed in that the control unit 101 is arranged to map the control message to a plurality of control channel element groups for the second communication device 20 within a single transmission time interval (subframe) on a radio control channel. The radio channel may in some embodiments comprise a PDCCH.

Furthermore, the first communication device 10 may comprise a receiving interface unit 103 arranged to receive measurement reports indicating the channel quality from the second communication device 20. This may be used by the control unit 101 to determine groups of CCEs and/or the control message. Information may also be received from the network over network input/output (I/O) interface 109.

In some embodiments, the control unit 101 is arranged to code the control message into a first coded control message according to a determined first code rate. The first code rate is based on a predetermined possibility value indicating possibility to detect the control message and a received report comprising a channel measurement of the radio control channel. Furthermore, the control unit 101 is further arranged to determine a first control channel element group to be used to transmit the control message based on the first coded control message. For example, the bit amount of the coded message may be analyzed to determine amount of CCEs in the group.

In some embodiments, the control unit 101 is arranged to map the control message to a plurality of control channel element groups comprising the same amount of control channel elements and in some embodiments the plurality of control channel element groups comprises different number of control channel elements. Then, when the plurality of control channel element groups comprises different number of control channel elements, the control unit 101 may be arranged to code the control message is not a second coded control message according to a second code rate, and to determine a second control channel element group for the second coded control message comprising a different number of control channel elements than the first control channel element group.

In some embodiments, the first/second control channel element group is determined from at least one table resulting in a code rate to be used.

The control unit 101 may further be arranged to detect an ACK/NAK signal on all possible uplink control channel resources corresponding to a multiple choices of control channel element groups. The signal is received over the receiving arrangement 103 such as an antenna or the like.

The control unit 101 is further arranged to determine and transmit the control message a plurality of times within a time transmission interval during a handover process when receiving a hand over request regarding the second communication device 20.

The control message may comprise communication configurations information to enable communications between the first communication device and second communication device 20, such as downlink control information.

The receiving interface unit 103 and transmission interface unit 105 may comprise an antenna arrangement.

The control unit 101 may determine to map the control message to a plurality of the control channel element groups of different aggregations levels, wherein an aggregation level is determined depending on the control channel quality; and within one aggregation level several different groups are possible.

The first communication device 10 may receive communication configuration information comprising the control message over the communication interface 109 from an Operations Support System node and/or the like.

Furthermore, the first communication device 10 may comprise a memory unit 107 arranged to be used to store an application to perform the method when executed on the control unit 101 and/or data relating to the communication configuration information, such as used groups of CCEs in order to check and detect ACK/NAK on corresponding uplink resources.

Figure 9:
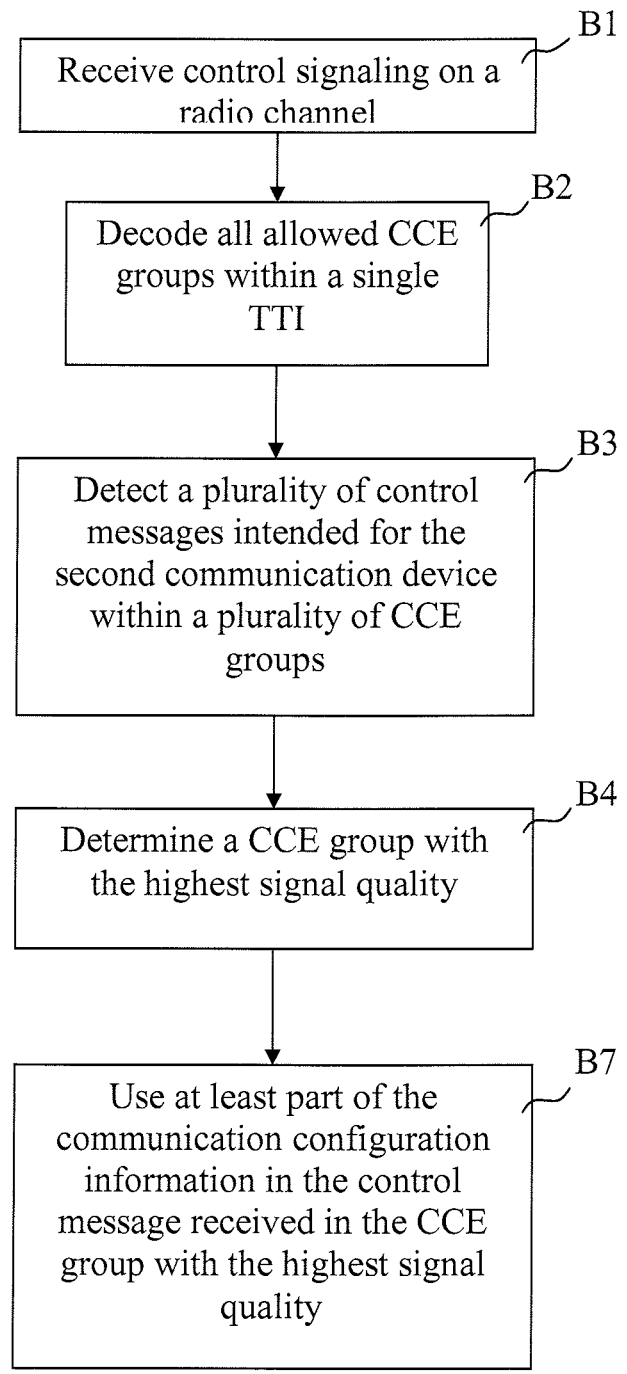
FIG. 9 shows a schematic overview of a flow chart of a method in a second communication device.

In FIG. 9, a schematic overview of a method in the second communication device 20 is shown. The method is for using at least part of communication configuration information in the control message. The second communication device 20 may comprise a UE, such as a mobile terminal, Personal Digital Assistant and/or the like.

In step B1, the second communication device 20 receives control signaling over a radio control channel, such as PDCCH or the like.

In step B2, the second communication device 20 decodes all allowed control channel element groups in a single transmission time interval of the radio control channel. In step B3, the second communication device 20 detects a plurality of control messages intended for the second communication device 20 within a plurality of control channel element groups within the single transmission time interval.

In step B4, the second communication device 20 determines a control channel element group with the highest signal quality of the plurality of control channel element groups. For example, the second communication device 20 may detect and compare SINR of the plurality of control channel element groups.

In step B7, the second communication device 20 uses at least part of the communication configuration information in the control message received in the control channel element group with the highest signal quality.

Figure 10:
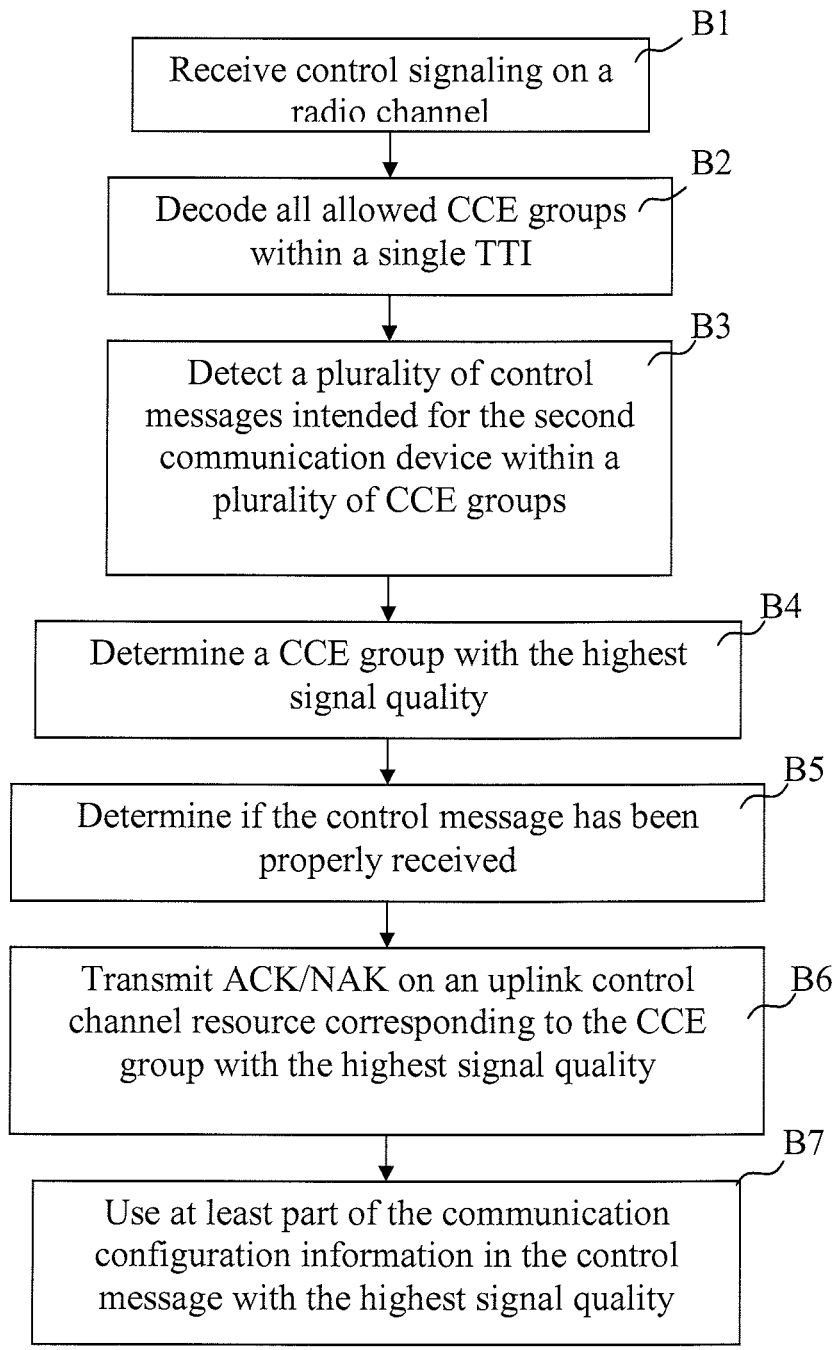
FIG. 10 shows a schematic overview of a flow chart of a method in a second communication device.

In FIG. 10, further embodiments for using at least part of communication configuration information of a control message in the second communication device 20 are shown.

In step B1, the second communication device 20, as in step B1 in FIG. 9, receives control signaling from the first communication device 10 over a radio control channel, such as PDCCH or the like.

In step B2, the second communication device 20, as in step B2 in FIG. 9, decodes all allowed control channel element groups in a single transmission time interval of the radio control channel.

In step B3, the second communication device 20, as in step B3 in FIG. 9, detects a plurality of control messages intended for the second communication device 20 within a plurality of control channel element groups within the single transmission time interval. The allowed control channel element groups may be set during configuration of the network.

In step B4, the second communication device 20 determines a control channel element group with the highest signal quality of the plurality of control channel element groups. Step B4 in FIG. 10 corresponds to step B4 in FIG. 9.

In optional step B5, the second communication device 20 determines whether the control message and data has been properly received by, for example, decoding the control message.

In optional step B6, the second communication device 20 transmits an ACK/NAK on an uplink control channel resource corresponding to the control channel element group with the highest signal quality based on the determination whether the control message and data has been properly received. For example, if the decoding results in a result that the control message has been properly received an ACK is transmitted and if the control message has not been received properly a NAK is transmitted.

In step B7, the second communication device 20 uses at least part of the communication configuration information in the control message received in the control channel element group with the highest signal quality.

It should be noted that the second communication device 20 may perform channel measurements and send a report of the channel measurement to the first communication device. These measurements may indicate channel quality indicator.

Figure 11:
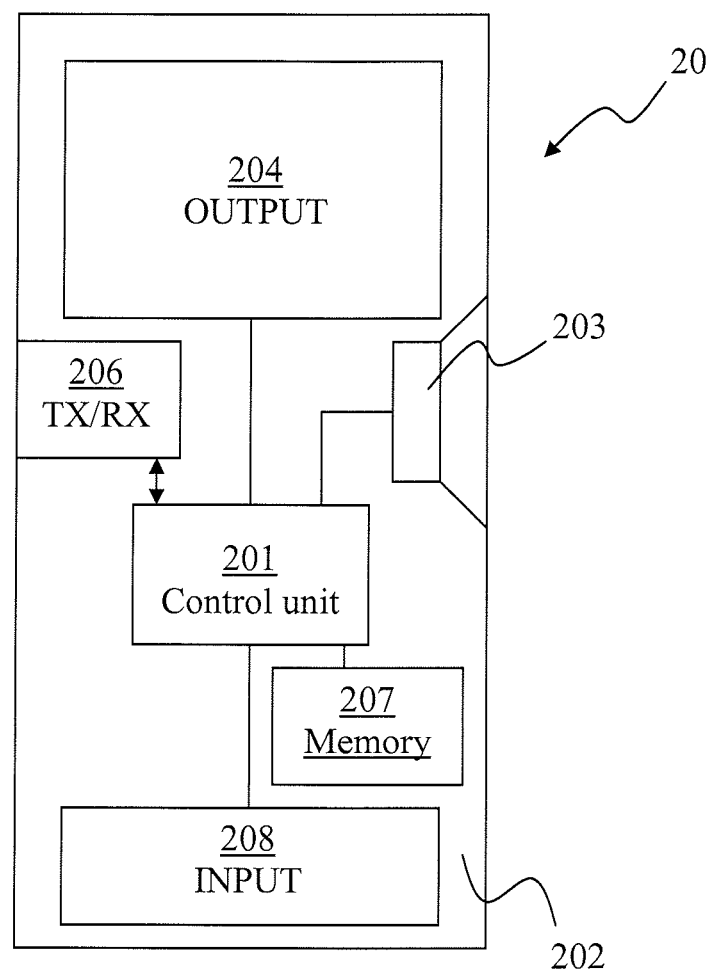
FIG. 11 shows a schematic overview of a second communication device.

In FIG. 11, a schematic overview of the second communication device 20 is shown. The second communication device 20 may comprise a user equipment.

The second communication device 20 in the illustrated embodiments includes a portable housing assembly 202, a user interface i.e. a man machine interface (MMI) including a speaker 203, i.e., a sound transducer, an output unit 204, such as a display, an input unit 208, such as a keypad, a control unit 201, a communication module 206, and a memory 207.

The communication module 206 is arranged to receive a control signaling from a first communication device over a radio control channel. The control unit 201 is arranged to decode all allowed control channel element groups in a single transmission time interval of the radio control channel and to detect a plurality of control messages intended for the second communication device 20 within a plurality of control channel element groups within the single transmission time interval.

The control unit 201 determines signal quality of received control channel resources and a control channel element with a highest signal quality. Furthermore, the control unit 201 is arranged to use at least part of a communication configuration information of the control message received in the control channel element group with the highest signal quality.

In some embodiments, the control unit 201 is further arranged to determine whether the control message and data has been properly received by decoding the control message.

The control unit 201 may then be arranged to transmit over the communication module 206 an ACK/NAK on an uplink control channel resource corresponding to a control channel element group with the highest signal quality based on the determination whether the control message and data has been properly received.

The output 204 may be any suitable display screen assembly. For example, the output 204 may be a liquid crystal display (LCD) with or without auxiliary lighting, e.g. a lighting panel, a touch panel and/or the like.

The user interface may include any suitable input unit/s 208 including, for example, a touch activated or touch sensitive device, e.g., a touch screen, a joystick, a keyboard/keypad, a dial, a directional key or keys, and/or a pointing device, such as a mouse, trackball, touch pad, etc. The speaker 203 generates sound responsive to an input audio signal. The user interface may also include a microphone coupled to an audio processor that is configured to generate an audio data stream responsive to sound incident on the microphone.

In some embodiments, the control unit 201 may further support various functions of the second communication device 20. The control unit 201 may be any commercially available or custom microprocessor, for example. In use, the control unit 201 of the second communication device 20 generates a display image on the output unit 204. The control unit 201 may control the components of the second communication device 20.

The memory 207 is configured to store digital information signals and data such as measured values, communication configurations, downlink control information, control messages, application to perform the method and/or the like.

The communication module 206 may be configured to communicate data over one or more wireless interfaces to another remote second communication device. The communication module 206 can include a cellular communication module, a direct point-to-point connection module, and/or a WLAN module.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first communication device in a radio telecommunications network for transmitting a control message comprising communication configuration information to a second communication device within the radio telecommunications network, the method comprising:
   determining the communication configuration information of the control message to be transmitted to the second communication device;
   mapping the control message to a plurality of control channel element groups for the second communication device;
   transmitting the control message to the second communication device over the plurality of control channel element groups within a single transmission time interval of a radio control channel;
   wherein the control message comprises communication configuration information to enable communications between the first communication device and the second communication device, and wherein the communication configuration information is based on received channel measurements or is preconfigured; and
   detecting an ACK/NAK signal on all possible uplink control channel resources corresponding to multiple choices of control channel element groups.

2. The method according to claim 1 wherein the plurality of control channel element groups comprises a single amount of control channel elements.

3. The method according to claim 1 wherein the plurality of control channel element groups comprises different numbers of control channel elements for different aggregations levels; wherein an aggregation level is determined depending on radio control channel quality.

4. The method according to claim 1 further comprising:
   receiving a report from the second communication device, the report comprising a channel measurement of the radio channel;
   coding the control message according to a first code rate to generate a first coded control message; wherein the first code rate is determined based on the received report and a predetermined possibility value indicating a possibility of detecting the control message; and
   wherein mapping the control message comprises mapping the first coded control message to a first control channel element group to be used to transmit the control message.

5. The method according to claim 4 further comprising:
   coding the control message according to a second code rate to generate a second coded control message; and
   wherein mapping the control message further comprises mapping the second coded control message to a second control channel element group.

6. The method according to claim 5 wherein at least one of the first and second control channel element groups is determined from at least one table resulting in the corresponding code rate to be used.

7. The method according to claim 1 wherein the method is performed during a handover process; and wherein the method further comprises receiving a handover request associated with the second communication device.

8. The method according to claim 1 wherein transmitting the control message comprises transmitting the control message on a physical downlink control channel.

9. A first communication device for transmitting a control message comprising communication configuration information to a second communication device within a radio telecommunications network, the first communication device comprising:
   a control unit configured to:
      determine the communication configuration information of the control message to be transmitted to the second communication device,
      map the control message to a plurality of control channel element groups for the second communication device; and
      detect an ACK/NAK signal on all possible uplink control channel resources corresponding to multiple choices of control channel element groups; and
   a transmission interface configured to transmit the control message over the plurality of control channel element groups within a single transmission time interval of the radio control channel;
   wherein the control message comprises communication configuration information to enable communications between the first communication device and the second communication device, and wherein the communication configuration information is based on received channel measurements or is preconfigured.

10. The first communication device according claim 9 wherein the first communication device comprises a base station.

11. A method in a second communication device for using at least part of communication configuration information in a control message, the method comprising:
   receiving control signaling from a first communication device over a radio control channel;
   decoding all allowed control channel element groups in a single transmission time interval of the radio control channel;
   detecting a plurality of control messages intended for the second communication device within a plurality of control channel element groups within the single transmission time interval of the radio control channel;
   determining a control channel element group with the highest signal quality of the plurality of control channel element groups;
   using at least part of the communication configuration information in the control message detected in the control channel element group with the highest signal quality;
   determining whether the control message and data has been properly received; and
   transmitting an ACK/NAK signal, based on whether the control message and data has been determined to have been properly received or not, on an uplink control channel resource corresponding to the control channel element group with the highest signal quality.

12. A second communication device comprising:
   a communication module configured to receive control signaling on a radio control channel from a first communication device;
   a control unit configured to:
      decode all allowed control channel element groups in a single transmission time interval of the radio control channel;
      detect a plurality of control messages intended for the second communication device within a plurality of control channel element groups within the single transmission time interval;
      determine a control channel element group with the highest signal quality of the plurality of control channel element groups;

determine to use at least part of a communication configuration information in the control message received in the control channel element group with the highest signal quality; and determine whether the control message and data has been properly received;

wherein the communication module is further configured to send an ACK/NAK signal, based on whether the control message and data has been determined to have been properly received or not, on an uplink control channel resource corresponding to the control channel element group with the highest signal duality.

13. The second communication device according to claim 12 wherein the second communication device comprises a user equipment.

* * * * *